June 11, 1940.   W. A. ABEGG   2,204,112
ROTARY TABLE BUSHING
Filed Feb. 7, 1939   3 Sheets-Sheet 1
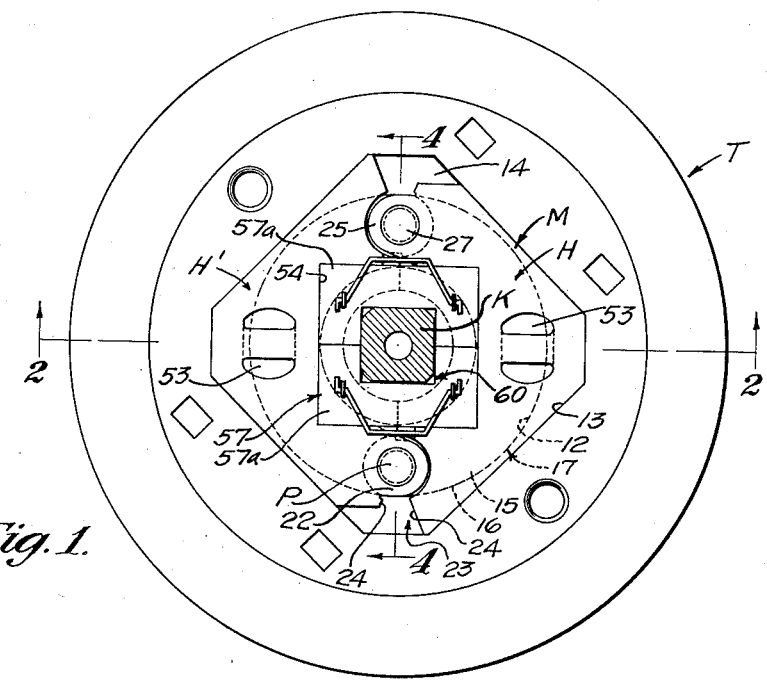
Fig. 1.
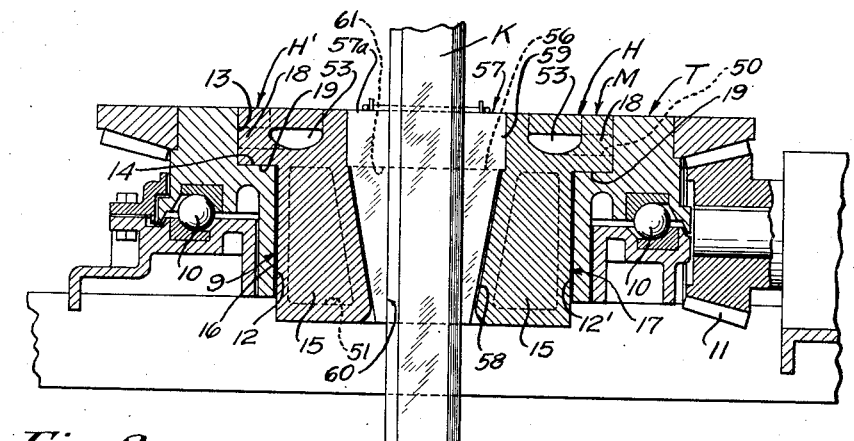
Fig. 2.
Inventor
Walter A. Abegg.
Attorney.

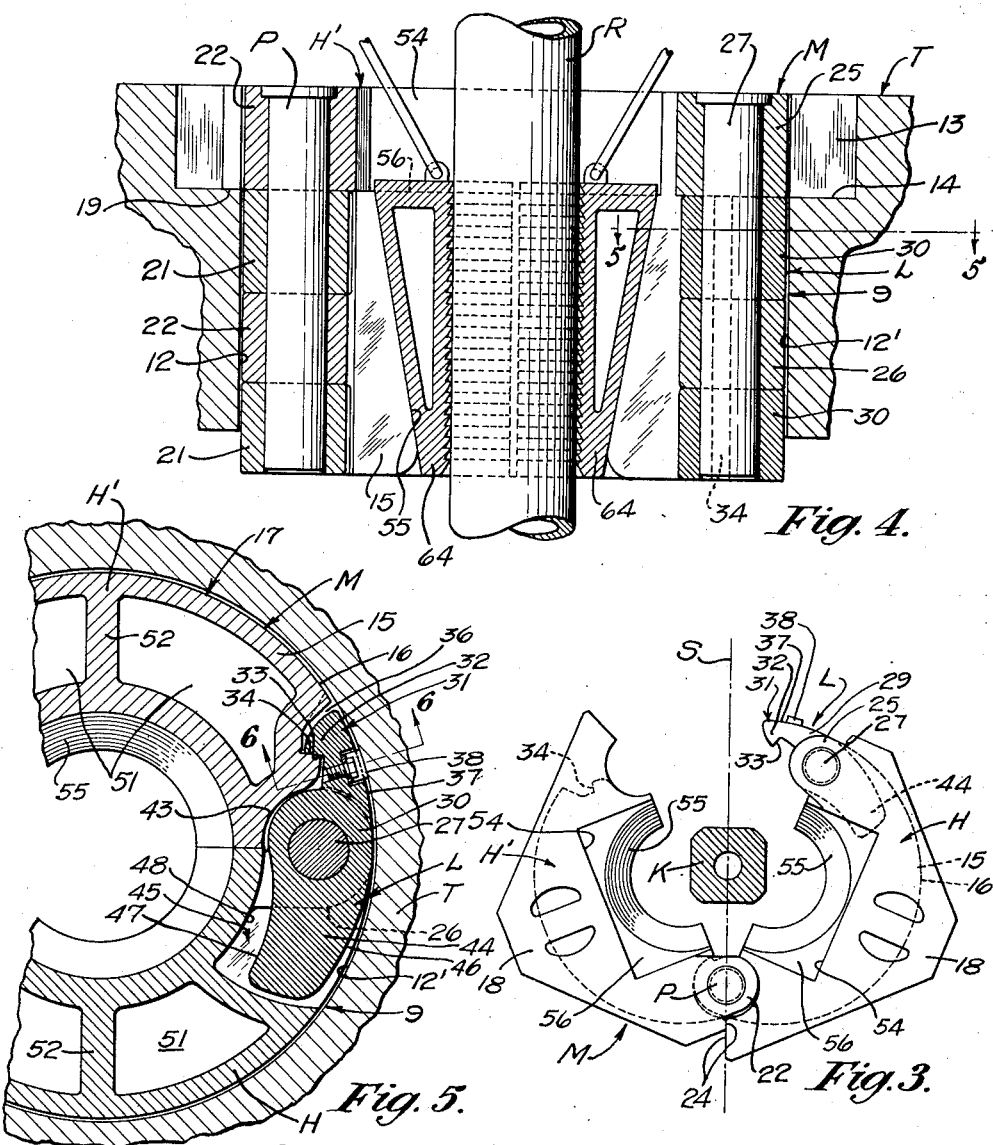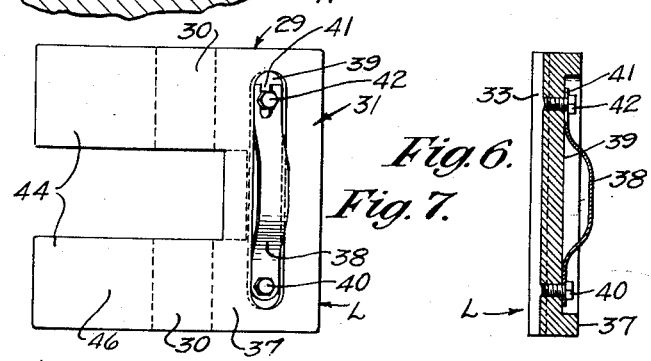

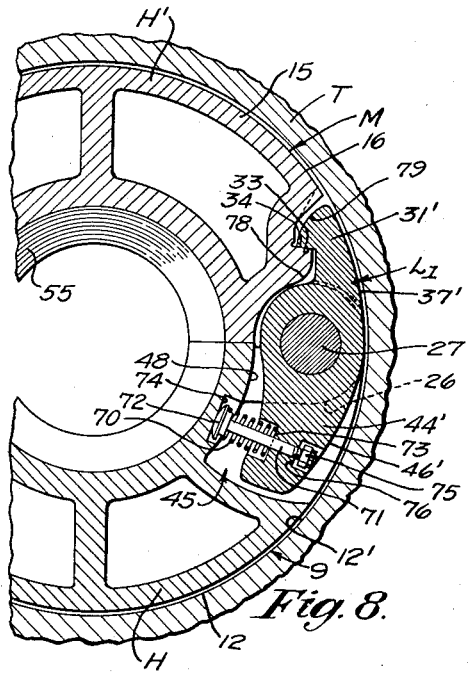
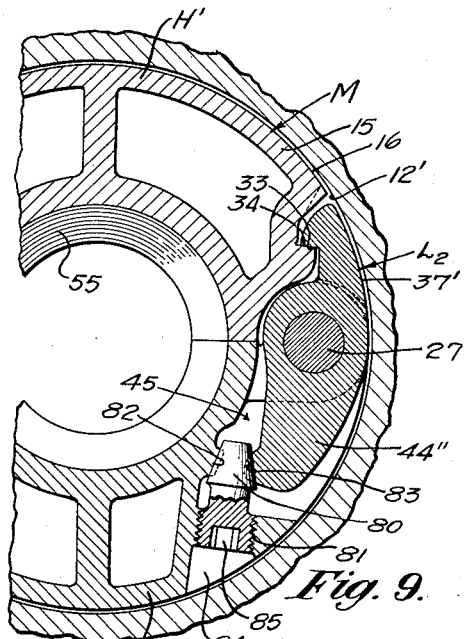
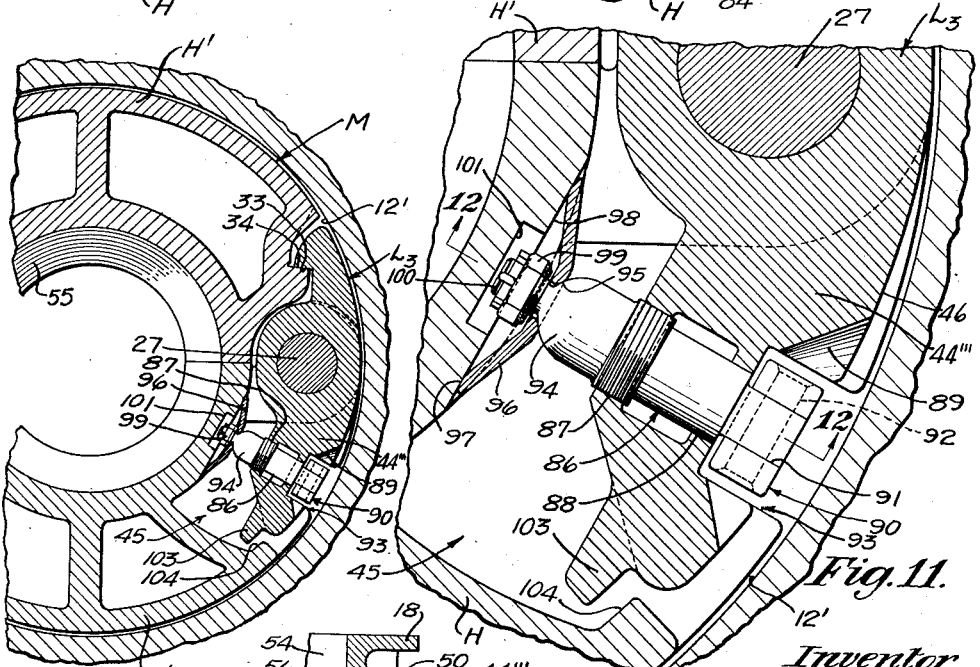
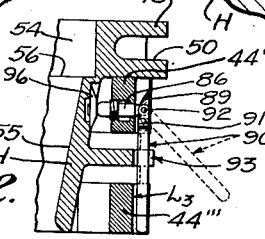

Patented June 11, 1940

2,204,112

UNITED STATES PATENT OFFICE 2,204,112

ROTARY TABLE BUSHING

Walter A. Abegg, Los Angeles, Calif., assignor of one-half to B. Reinhold, Los Angeles, Calif.

Application February 7, 1939, Serial No. 255,088

13 Claims. (Cl. 255—23)

This invention has to do generally with bushings, and is more particularly concerned with bushings of a type commonly known as table or master bushings, used in rotary tables of well drilling rigs.

The improvements represented by the present invention will be more readily understood by first briefly describing some of the ordinary functions of master bushings. The rotary, horizontally extending table has a central bushing-receiving opening, commonly cylindrical in its lower part, square in its upper part, and with an upwardly facing shoulder provided between the two parts. Within this table opening, is removably fitted a set of table bushings which, in turn, receive a set of pipe engaging bushings which may either be of the type commonly known as slips for supporting pipe, or of the type known as driving or "kelly" bushings used to engage a "grief-pipe" or "kelly" of polygonal cross section, the rotary drive being transmitted from the table through the table bushing, kelly bushing and kelly.

The table bushings, kelly bushings, and slips are each usually made in two or more sections. Due to the wedging action of the pipe supporting slips and the reactive forces involved in the driving torque when the kelly bushings are used, spreading pressure are put upon the table bushings, thus tending to spread the table bushing sections apart and developing loosenesses which ultimately result either in deformation of the pipe engaging members or putting uneven inward radially directed pressure thereon in a manner which ultimately results in actually radially deforming and weakening the work. It has been found that most failures in drilling strings occur at points where the pipe engaging member or bushings take hold, and it has been demonstrated that the reason for such localized failure is due to the uneven strains placed upon the work by reason of the situation outlined above.

I have devised a bushing which has the highly advantageous characteristic of being movable bodily as a unit into and out of the table bore, the bushing being in the nature of hingedly connected sections which may be swung open at one side for application to or removal from the work when the bushing is clear of the table bore, and yet have provided means whereby the bushing sections are held tightly against radial expansion when they are seated within the table bore, thus being adapted effectively to resist the spreading forces spoken of above.

This holding together of the bushing parts is accomplished without the necessity of the bushing fitting tightly within the table bore, it resulting that sufficient clearance exists between table and bushing to allow free, rapid insertion or removal of the bushing with respect to the table bore, and yet the free working clearance thus provided does not permit the bushing sections from opening up or loosening.

Generally, I accomplish the desired end by the use of a latch connection between the ends of the bushing segments or sections, this latch having a constant tendency to draw the free ends of said segments together and thus to hold the bushing in tightly constricted condition. Several different methods of insuring this tightly latched engagement are illustrated in the accompanying drawings, but the features of the particular mechanisms for accomplishing the desired ends may be pointed out to better advantage as the following detailed description progresses. However, it is common to all the forms, that the outer face of the hook end of the latch is disposed in direct opposition to the defining wall of the table bore and thus positively limited in its unlatching movement as long as the bushing is seated in the table bore.

Since the preferred type of latch is mounted for rotation about a vertical axis, I have found it feasible to so fashion the latch body that centrifugal force has a tendency to constantly urge the latch in a direction to tightly constrict the bushing sections, this feature of utilizing centrifugal force for the stated purpose being particularly appropriate to present day practices of rotating tables at relatively high speeds.

Other features of novelty and objects of the invention will be made apparent from the following detailed description, reference being had to the accompanying drawings, in which:

Fig. 1 is a plan view showing my improved bushing as it appears when applied to a rotary table, and with drive or kelly bushings installed in the bore of the table bushing;

Fig. 2 is a vertical section taken on line 2—2 of Fig. 1;

Fig. 3 is a detached plan view of the table bushing, showing it unlatched and swung to open position from about the work;

Fig. 4 is an enlarged, fragmentary section on line 4—4 of Fig. 1, but showing cylindrical work substituted for the polygonal kelly bushing, and the substitution of slips for the kelly bushing;

Fig. 5 is an enlarged, fragmentary plan section on line 5—5 of Fig. 4;

Fig. 6 is a section on line 6—6 of Fig. 5, showing only the latch;

Fig. 7 is a detached side elevation of the latch, as viewed from the right of Fig. 6;

Fig. 8 is a view similar to Fig. 5 but showing a variational type of latch;

Fig. 9 is a view similar to Fig. 5 but showing another variational type of latch;

Fig. 10 is a view like Fig. 5 but showing still another variational type of latch;

Fig. 11 is an enlarged fragmentary detail of the latch tightening means shown in Fig. 10; and Fig. 12 is a reduced section on line 12—12 of Fig. 11.

A typical rotary table, mounted on bearings 10 and driven by gear 11, is indicated at T, the table having a central opening or bore 9 whose lower part 12 is cylindric and whose upper part 13 is substantially square, the corners of the square preferably being relieved as shown in Fig. 1. The cylindric defining wall of bore-part 12 is indicated at 12'. The square, upper part 13 of the table opening is sufficiently large to present an upwardly facing shoulder 14 between parts 12 and 13. This shoulder may or may not be continuous around the opening, but is of sufficient extent to afford support for the master or table bushing generally indicated at M.

Table bushing M is made up of a plurality of segments or sections adapted to be hingedly connected by a pin P at one set of their adjacent ends, while the opposite or distal ends are adapted to be disconnectedly joined by a latch generally indicated at L. In the specific form here being described, the sections are in the form of halves, H and H' which, except for their hinge and latch formations, are substantially symmetrical. When the sections are latched together the bushing may be bodily inserted in or removed from the table bore 9.

Each bushing section has a lower portion 15, the exterior surface of which is substantially cylindric, as indicated at 16, which, when the two halves are latched together, form a substantially cylindric lower bushing assembly 17 adapted to fit freely and with slight annular clearance into the lower cylindric portion 12 of the table opening.

The upper portion of each bushing half or section is provided with a half-square flange 18 which presents a downwardly facing shoulder 19 adapted to seat on the upwardly facing shoulder 14 of the table, the composite square or head made up of these two half-flanges fitting fairly closely, but yet freely, into the square opening 13 of the table and coacting with the defining wall of that square opening, there thus being provided drive shoulders whereby rotary motion of the table is transmitted to the master bushing and, in turn, to work-engaging members (to be described) carried by the bushing and thence to the work. On the other hand, shoulder 14 takes the bushing shoulder 19 in a manner to support the bushing against downwardly directed loads which may be transmitted to that bushing from the work through work-engaging members, to be described.

The plane of separation of the two bushing halves, indicated by S in Fig. 3, and coinciding generally with the section line 4—4 of Fig. 1, is here shown as on a diagonal of the square.

Near the joining ends of the two bushing halves, they are connected by pin P. As shown particularly in Fig. 4, the two bushing halves have interfitting projections or hinge lugs bored for the reception of pin P which fits all the lugs relatively tightly but gives them a capacity for relative pivotal movement. The lugs on bushing-half H are indicated at 21, while the lugs carried by bushing-half H' are indicated at 22.

Radially outward beyond the pin connection, the two bushing halves are relieved as at 23, so when latch L is released the bushing may be opened up as indicated in Fig. 3, the shoulders 24 limiting the extent of spread.

Bushing halve H is provided at its distal end with vertically spaced latch lugs 25 and 26, the upper lug 25 preferably being of the same thickness as flange 18 and its upper face being substantially flush with the upper face of the bushing, proper. Lugs 25 and 26 carry a vertical pin 27 upon which latch L is mounted for pivotal movement with relation to bushing half H. Latch L is U-shaped and consists of a body 29 having lugs 30 which interfit with bushing lugs 25 and 26, the hook end 31 of the latch extending vertically from a point just below flange 18 to the lower end of the bushing. The latch hook is indicated at 32, the effective latching shoulder 33 thereof extending from the top to bottom of the latch, shoulder 33 being related to the pivotal axis of the latch and preferably being so inclined (as illustrated in Fig. 5) as to effect a bushing-closing, camming action upon the keeper shoulder 34 of bushing half H', when the latch is rotated in a counterclockwise direction, as viewed in Fig. 5. Shoulder 34 is formed by one of the defining walls of recess 36 in bushing section H', shoulders 33 and 34 preferably being vertically co-extensive. The outer face 37 of hook end 31 is arcuate, being of substantially the same curvature as that of cylindric face 16 and, when the latch is in closed position, being substantially flush with that cylindric face. Accordingly, when the latched bushing is lowered within the table bore, face 37 is opposed by defining wall 12' of the table bore 12, it following that the latch cannot possibly be moved to a release position so long as the bushing occupies the table bore.

Additionally, I provide means carried by the latch and coacting with bore wall 12' for constantly urging the latch in a bushing-closing direction, thus serving to forcibly hold the distal ends of the bushing halves against separative movement, to the advantageous ends spoken of in the forepart of the specification. This means comprises a bowed, leaf spring 38 which is taken in recess 39, sunk below the face 37 of hook end 31, as clearly shown in Figs. 5, 6 and 7. One end of the spring is anchored as by bolt 40, while the other end of the spring is slotted as at 41 to accommodate bolt 42, whereby that end of the spring is held from separative movement with respect to the latch, but is allowed to slide endwise during flexure of the spring. The spring is of such shape and tension that, in its engagement with bore wall 12', it exerts considerable radially directed force against latch end 31 in a manner tending to rotate that end in a counter-clockwise direction, as viewed in Fig. 5, and thus constantly maintaining a tight bushing-closing effect.

It will be noted, however, that due to the shape and arrangement of spring 38, in spite of the fact that it will project radially outward beyond the projected bore of the table when the bushing centered with the table-bore but is vertically clear thereof, the spring will flex inwardly as the bushing is lowered into the table bore so as not to interfere with the easy insertion of the bushing within the table bore.

It will be noted that the distal end of bushing half H′ is vertically recessed as at 43 to accommodate, with clearance, the inner portions of latch lugs 30 when the bushing is closed.

As a feature further tending to maintain the latch in a condition constantly urging the distal ends of the bushing halves into positions of tight closure, I preferably provide the latch with a relatively heavy "tail" 44 which, due to centrifugal action, tends always to swing the latch in a counter-clockwise direction, as viewed in Fig. 5, when the table, and hence the bushing, are rotated. Thus, as the angular velocity of the table is increased and therefore has an increased tendency to spread the bushing ends apart, that increased angular velocity has a greater tendency to throw the latch more tightly into bushing-closing position, thus counteracting the spreading effect as imposed upon the bushing parts themselves.

Bushing half H is recessed at 45 to take weighted tail 44, the tail face 46, which may be considered as an extension of face 37, being shaped so that there will always be clearance between it and bore wall 12′ so the centrifugal effect may not be lost by reason of tail-contact with that bore wall. On the other hand, the opposite face 47 is sufficiently spaced from recess wall 48 to allow the latch to be swung in a clockwise direction, as viewed in Fig. 5, to unlatch the bushing when the bushing, as a whole, is clear of the table.

The upper or square portions of the bushing halves are recesed, as at 50, and the lower portions are internally cored out as at 51 to lighten the structure, ribs 52, however, giving the structure requisite strength. In the upper faces of the bushing sections I provide usual hook holes 53 to facilitate raising or lowering of the bushing.

Though this is not limitative on the invention, the internal opening in table bushing M may be of the form shown, wherein an upper, square portion 54 and lower tapered conical portion 55 provide an intermediate, upwardly facing shoulder 56.

Bushings for rotationally driving the work, such as rotary pipe or kelly K, may be of any suitable type, here being shown as a two-part kelly bushing 57 (although one-piece drive bushings are sometimes used) each bushing part 57a having a tapered lower portion 58 adapted to be taken in the conical bore 55 of bushing M, and an upper rectangular portion 59 adapted to be taken in the square portion 54 of the table bushing. The composite internal opening 60 in the kelly bushing assembly, is shaped to conform with the kelly in use, here being shown as square.

The reactive forces existing by reason of the driving torque applied by bushing 57 tend to radially spread bushing parts 57a, and either that tendency or the spreading tendency accompanying the transmission of driving torque from the table bushing to bushing 57 tend to spread the halves of table bushing M. Or, if the kelly bushing be of one part, that one-part bushing still tends to spread the table bushing by reason of the torque forces. It has been explained above that spreading of the table bushing has very harmful effect, but it will be seen that due to the provisions above described for counteracting this spreading effect and actually always tending to force the bushing parts more tightly together, this source of trouble is eliminated or at least reduced to a negligible factor, and therefore make of the bushing an appliance which in no way tends to weaken the work by putting uneven strains and pressures thereon.

Likewise, by preventing the table bushing from spreading, the bushing is prevented from transmitting its spreading force to the table, thus preventing undue wear upon the bore-defining walls of the table.

It will be understod that in usual kelly bushings, the underface 61 rests upon the shoulder 56 of the table bushing, while the conical portion 58 of the kelly bushing is taken somewhat loosely in the conical bore 55 of the master bushing.

In Fig. 4, the work is shown in the form of a cylindric pipe or drill stem R, and usual pipe supporting bushings or segmental wedge slips 64 are substituted for the kelly bushing 57. Slips 64 fit into the lower, conical portion 55 of the table bushing and, in riding down the tapered surfaces of that bore, wedgingly grip work R to prevent the latter from dropping. It will be obvious that the lateral or horizontal forces involved in this wedge-gripping action are considerable and in some cases are extremely large. Obviously, these forces tend to spread the table bushing which spread, if not prevented, has the harmful effects spoken of above. However, by the use of the latching means I have described, such spreading forces are counteracted and, in effect, overcome.

In Fig. 8 I have shown a variational type of latch. All other parts of the structure may be similar to the corresponding parts of Figs. 1 to 5, inclusive, and therefore will be given the same reference numerals, obviating the need for repetitive description.

Here, the latch L1 is mounted in the same manner as latch L and its hook end 31′ has substantially the same characteristics as and functions in the same manner as latch end 31 except that the spring 38 is omitted. In place of this spring, I provide means for forcing the latch inwardly to hold the bushing parts tightly together, by the imposition of yieldable spreading means between wall 48 of recess 45 and the "tail" 44′ of the latch. This means comprises a compression spring 70 about a bolt 71 which is mounted for relative endwise movement through tail 44′. Spring 70 acts between bolt head 72 and tail shoulder 73 in such a manner, that, with head 72 seated in recess 74, it tends to throw the latch in a counter-clockwise direction and thus more tightly constrict the master bushing segments.

Latch face 37′ is opposed to bore-wall 12′ in the manner previously described in connection with latch L, and is thus prevented positively from disengagement from bushing half H′ so long as the bushing is within the table bore. The tail is shaped so that it clears wall 12′ sufficiently to prevent engagement which would positively limit counter-clockwise movement of the latch, and thus does not interfere with the functioning of hook end 31′, which is the same as that described in connection with end 31. Likewise, clearance exists between bolt head 75 and tail shoulder 76 so such counter-clockwise movement of the latch is not prevented at this point.

However, when the bushing is bodily lifted from the table bore, tail 44′ may be manually pressed in a clockwise direction against the tension of spring 70 and hook end 31 thus cleared from bushing half H′ to allow spreading of the bushing. Upon subsequent closing of the bushing preliminarily to introduction in the table bore, latch L′ will automatically be cammed outwardly by the engagement of cam faces 78 and 79, on bushing part H' and the nose of latch L', respectively, and spring 70 will then act automatically to swing the latch into operative or latching position.

Preferably, latch tail 44' is of sufficient mass and is so positioned as to tend to rotate latch L1 more tightly into latching position and thus more tightly constrict the bushing about the work, under the influence of centrifugal force as set up by table-rotation.

In Fig. 9 I have shown a variational type of latch generally similar to latch L1 except for the latch-tightening means provided between the latch tail and bushing-segment H. In all other respects the structure and functions may be considered as equivalent to the previously described showings.

Here, the latch-tightening means is in the form of a wedge cone or spreader 80 threadably connected at 81 to bushing segment H and extended between the taper face 82 of that bushing segment and the taper face 83 on the free end of tail 44" of latch L2. Spreader 80 is thus positioned, in effect, within recess 45, while its outer end is exposed to recess 84 and is provided with a polygonal end-socket 85 to take an adjusting tool.

When the bushing is removed from the table bore, spreader 80 may be threadably adjusted by a tool introduced through recess 84 and into socket 85, either projecting it further between faces 82 and 83 to tighten the latch (with the advantageous results spoken of above) or to retract cone 80 from between faces 82 and 83 to allow clockwise movement of the latch to a position of clearance for permitting the bushing to be opened up.

Here again, the face 37' of the latch is prevented by bore wall 12' from moving to open position in the event of failure of the spreading cone 80, and tail 44" is of sufficient mass to give the latch self-closing effect under the influence of centrifugal force generated by table rotation.

In Figs. 10, 11 and 12, I have shown a variational type of latch-tightening means. Except for this change, the bushing and latch parts are similar to and function as corresponding parts previously described. Here, the latch-tightening means applied to latch L3 is in the form of a bolt member 86 extending transversely of tail 44''' and having threaded connection therewith at 87. Bore 88, which accommodates bolt 86, opens to conical counterbore 89 which presents its large opening to the exterior of the latch tail. An operating lever 90 has its upper forked end 91 pivotally connected at 92 to the end of bolt 86, fork 91 lying within counterbore 89. The shank 92 of the lever normally hangs vertically within slot 93 of the bushing which extends downwardly from counterbore 89, the outer faces of the fork and lever being positioned so they do not extend outwardly beyond the outer face of the latch tail or of the bushing.

The inner end of bolt 86 is provided with a substantially spherical head 94 engaging complementary seat 95 centrally provided in the conical spring washer 96 which engages at its base edge 97 the square-cut shoulder 98 of bushing segment H, said shoulder 98 partially defining recess 45. The washer is held in assembly with bolt 86 by a nut 99 threaded on the tip or extension 100 of the bolt, said extension passing through a central aperture in the washer. When the assembly is in condition of Fig. 10, it will be seen that spring 96 is tensioned and thus exerts an outward radial thrust on bolt 86 and therefore tail 44''' tending to rotate the latch in a direction to draw the bushing parts closely together. The bolt is rotated, when the bushing is clear of the table, to apply or release the latch or to vary the effective tension of spring 96 by lifting the lower end of operating lever 90 approximately to the dotted line position of Fig. 12 and then swinging the handle through the arc permitted by the formation of conical counterbore 89. The engagement of the end of bolt tip 100 with body shoulder 101 will limit the extent to which the bolt may be tightened so as never to put an undue strain upon washer 96.

With handle 90 lying within recess 93 when the bushing is within the table bore, it will be seen that that handle prevents rotation of bolt 86 and thus holds the bolt in its adjusted position, with spring washer 96 constantly urging the latch in a bushing-closing direction.

As in the previously described cases, tail 44''', particularly in view of the appurtenances carried thereby, is of sufficient mass to give the latch self-closing or tightening effect under the influence of centrifugal force generated by table rotation.

When the bushing is removed from the table bore, bolt 86 is retracted sufficiently to relieve all tension on washer 96 and to move it bodily a sufficient distance to permit inward swinging of the latch tail a distance sufficient to clear the latch hook from bushing segment H'.

In order to limit counter-clockwise movement of the latch when the bushing is opened up, I provide a stop lug 103 on the latch tail adapted to engage the inner wall 104 of recess 45 under this condition, though the stop is sufficiently spaced from face 104 when the latch is applied to bushing segment H', to eliminate the possibility of that stop engaging face 104 in a manner to prevent the latch from swinging sufficiently in a counter-clockwise direction to effect the tight constriction of the bushing-parts.

As in the other cases, the latch tail is preferably of a mass which will allow advantage to be taken of centrifugal force, as has been described above.

While I have described preferred embodiments of my invention, it will be understood that various changes in design, structures, and arrangement may be made without departing from the spirit and scope of the appended claims.

I claim:

1. A bushing for insertion in the bore of a rotary table, comprising a plurality of complementary bushing sections forming, when closed together, a unitary bushing adapted exteriorly to fit a table bore and interiorly to take pipe engaging members or other work, a hinge connection between one set of adjacent section ends, a releasable latch pivotally mounted on one section and engageable with the adjacent section to hold the bushing closed, said latch being adapted to be positioned within the table bore and to be radially spaced from the defining wall of said bore when the bushing is inserted in said bore, so as not to interfere with the lowering or raising of the bushing into or out of the table bore cam surfaces on the latch and said adjacent section, and means acting while the bushing is closed to cause coaction between said cam surfaces in a manner tending to more tightly close the bushing to prevent accidental release of the latch during operation of the table.

2. A bushing for insertion in the bore of a rotary table, comprising a plurality of complementary bushing sections forming, when closed together, a unitary bushing adapted exteriorly to fit a table bore and interiorly to take pipe engaging members or other work, the bushing having a substantially cylindrical part, there being a recess in the cylindrical part opening to the outer peripheral face thereof, a hinge connection between one set of adjacent section ends, and a releasable latch pivotally mounted on one section and located in said recess, said latch being adapted to be radially spaced from the defining wall of the table bore when the bushing is inserted in said bore, said latch being engageable with the adjacent section to hold the bushing closed, and, when in holding engagement lying wholly within the recess so as not to interfere with the lowering or raising of the bushing into or out of the table bore.

3. A bushing for insertion in the bore of a rotary table, comprising a plurality of complementary bushing sections forming, when closed together, a unitary bushing adapted exteriorly to fit a table bore and interiorly to take pipe engaging members or other work, a hinge connection between one set of adjacent section ends, a releasable latch pivotally mounted on one section and engageable with the adjacent section to hold the bushing closed, said latch being adapted to be positioned within the table bore and to be radially spaced from the defining wall of said bore when the bushing is inserted in said bore, so as not to interfere with the lowering or raising of the bushing into or out of the table bore and means acting between the latch and said one section while the bushing is closed to urge said latch pivotally in a manner tending to more tightly close the bushing.

4. In combination with a rotary table having a vertically extending, bushing-taking bore, a bushing for the bore and comprising a plurality of complementary bushing sections forming, when closed together, a unitary bushing adapted exteriorly to fit the table bore and interiorly to take pipe-engaging members or other work, said bushing being vertically movable as a unit into and out of seated position within said bore, a hinge connection between one set of adjacent section ends, a latch pivotally movable about a vertical axis and mounted near one end of a second set of adjacent section ends and movable, when the bushing is unseated, to and from a position engaging the other end of said second set to hold the bushing closed, said latch being positioned within the table bore and being radially spaced from the defining wall of said bore when the bushing is seated in said bore, so as not to interfere with the lowering or raising of the bushing into or out of the table bore and a weight on said latch disposed in a position to cause said latch to have an effective tendency to move in a bushing-holding direction under the influence of centrifugal force when the table is rotated.

5. In combination with a rotary table having a vertically extending, bushing-taking bore, a bushing for the bore and comprising a plurality of complementary bushing sections forming, when closed together, a unitary bushing adapted exteriorly to fit the table bore and interiorly to take pipe-engaging members or other work, said bushing being vertically movable as a unit into and out of seated position within said bore, a hinge connection between one set of adjacent section ends, a latch mounted for pivotal movement about a vertical axis and carried by one of the sections, said latch being movable into and out of a position of latching engagement with an adjacent section and acting when the bushing is within the table bore, to hold the bushing closed, a portion of said latch being movable outwardly with respect to the bushing axis when the latch is moved out of latching engagement, said portion being opposed to the defining wall of the table bore and radially spaced therefrom a distance less than the extent of latch movement necessary to disengage the latch from said adjacent section.

6. In combination with a rotary table having a vertically extending, bushing-taking bore, a bushing for the bore and comprising a plurality of complementary bushing sections forming, when closed together, a unitary bushing adapted exteriorly to fit the table bore and interiorly to take pipe-engaging members or other work, said bushing being vertically movable as a unit into and out of seated position within said bore, a hinge connection between one set of adjacent section ends, a latch on one of the sections for movement into and out of a position of latching engagement with an adjacent section and acting when the bushing is within the table bore, to hold the bushing closed, a portion of said latch being movable outwardly with respect to the bushing axis when the latch is moved out of latching engagement, said portion being opposed to the defining wall of the table, and means acting between the bore defining wall and said portion to urge said latch in a manner tending to more tightly close the bushing.

7. In combination with a rotary table having a vertically extending, bushing-taking bore, a bushing for the bore and comprising a plurality of complementary bushing sections forming, when closed together, a unitary bushing adapted exteriorly to fit the table bore and interiorly to take pipe-engaging members or other work, said bushing being vertically movable as a unit into and out of seated position within said bore, a hinge connection between one set of adjacent section ends, a latch on one of the sections for movement into and out of a position of latching engagement with an adjacent section and acting when the bushing is within the table bore, to hold the bushing closed, a portion of said latch being movable outwardly with respect to the bushing axis when the latch is moved out of latching engagement, said portion being opposed to the defining wall of the table, and a spring carried by the latch and acting between the bore defining wall and said portion to urge said latch in a manner tending to more tightly close the bushing.

8. A bushing for insertion in the bore of a rotary table, comprising a plurality of complementary bushing sections forming, when closed together, a unitary bushing adapted exteriorly to fit a table bore and interiorly to take pipe engaging members or other work, a hinge connection between one set of adjacent section ends, a releasable latch mounted for pivotal movement on one section and engageable with the adjacent section to hold the bushing closed, said latch being adapted to be positioned within the table bore and to be radially spaced from the defining wall of said bore when the bushing is inserted in said bore, so as not to interfere with the lowering or raising of the bushing into or out of the table bore and releasable holding means adapted to hold the latch in a position of engagement with the adjacent section.

9. A bushing for insertion in the bore of a rotary table, comprising a plurality of complementary bushing sections forming, when closed together, a unitary bushing adapted exteriorly to fit a table bore and interiorly to take pipe engaging members or other work, a hinge connection between one set of adjacent section ends, a releasable latch carried by one section and engageable with the adjacent section to hold the bushing closed, said latch being adapted to be positioned within the table bore and to be radially spaced from the defining wall of said bore when the bushing is inserted in said bore, so as not to interfere with the lowering or raising of the bushing into or out of the table bore and releasable holding means adapted to hold the latch in a position of engagement with the adjacent section, said holding means being adjustable to vary the tightness of latch engagement, and releasable means for maintaining the holding means in adjusted condition.

10. A bushing for insertion in the bore of a rotary table, comprising a plurality of complementary bushing members forming, when closed together, a unitary bushing adapted exteriorly to fit a table bore and interiorly to take pipe engaging members or other work, a hinge connection between one set of adjacent member ends, a releasable latch member carried by one bushing member and engageable with the adjacent bushing member to hold the bushing closed, said latch being adapted to be positioned within the table bore and to be radially spaced from the defining wall of said bore when the bushing is inserted in said bore, so as not to interfere with the lowering or raising of the bushing into or out of the table bore and an actuator threadably mounted in one of the members and engageable with another member to move the latch towards engaging position.

11. In combination with a rotary table having a vertically extending, bushing-taking core, a bushing for the bore and comprising a plurality of complementary bushing sections forming, when closed together, a unitary bushing adapted exteriorly to fit the table bore and interiorly to take pipe-engaging members or other work, said bushing being vertically movable as a unit into and out of seated position within said bore, a hinge connection between one set of adjacent section ends, a releasable latch pivotally mounted on one end of a second set of adjacent section ends and pivotally movable, when the bushing is unseated, to and from a position engaging the other end of said second set to hold the bushing closed, said latch being positioned on the bushing to lie below the table top and being radially spaced from the defining wall of the table bore when the bushing is seated.

12. A bushing for insertion in the bore of a rotary table, comprising a plurality of complementary bushing sections forming, when closed together, a unitary bushing adapted exteriorly to fit a table bore and interiorly to take pipe engaging members or other word, the bushing having a substantially cylindrical part, there being a recess in the cylindrical part and opening to the outer peripheral wall thereof, a hinge connection between one set of adjacent section ends, and a releasable latch mounted for pivotal movement about a vertical axis on one section and located in said recess, said latch having hook and tail portions at opposite sides of the pivotal axis, the hook portion being engageable with the adjacent section to hold the bushing closed, and the latch being adapted, when the hook portion is in holding engagement and the bushing is seated within the table bore, to lie wholly within the recess with the outer face of the hook portion, where it is exposed at the outer side of the recess, extending substantially in flush relationship to the cylindric face of the bushing and the outer face of the tail portion extending somewhat below said cylindric face.

13. A bushing for insertion in the bore of a rotary table, comprising a plurality of complementary bushing members forming, when closed together, a unitary bushing adapted exteriorly to fit a table bore and interiorly to take pipe engaging members or other work, a hinge connection between one set of adjacent member ends, a releasable latch member carried by one bushing member and engageable with the adjacent bushing member to hold the bushing closed, said latch member being adapted to be positioned within the table bore and to be radially spaced from the defining wall of said bore when the bushing is inserted in said bore, so as not to interfere with the lowering or raising of the bushing into or out of the table bore, an actuator threaded in the latch member, and yieldable means connected to the actuator and engaging one of the bushing members to move the latch towards engaging position.

WALTER A. ABEGG.

CERTIFICATE OF CORRECTION.

Patent No. 2,204,112.  June 11, 1940.

WALTER A. ABEGG.

It is hereby certified that error appears in the printed specification of the above numbered patent requiring correction as follows: Page 6, first column, line 44, claim 11, for the word "core" read --bore--; and second column, line 13, claim 12, for "word" read --work--; and that the said Letters Patent should be read with this correction therein that the same may conform to the record of the case in the Patent Office.

Signed and sealed this 6th day of August, A. D. 1940.

Henry Van Arsdale,
Acting Commissioner of Patents.

(Seal)